US012206341B2

(12) United States Patent
Saneyoshi et al.

(10) Patent No.: US 12,206,341 B2
(45) Date of Patent: Jan. 21, 2025

(54) MULTILAYER ELECTROSTATIC ACTUATOR

(71) Applicant: STRAWB Inc., Kanagawa (JP)

(72) Inventors: Keiji Saneyoshi, Kanagawa (JP); Hikaru Izumitani, Kanagawa (JP); Makoto Ito, Kanagawa (JP); Kazuo Okuda, Kanagawa (JP); Tomio Uchi, Kanagawa (JP); Yuichi Imai, Kanagawa (JP)

(73) Assignee: STRAWB Inc., Kanagawa (JP)

( * ) Notice: Subject to any disclaimer, the term of this patent is extended or adjusted under 35 U.S.C. 154(b) by 218 days.

(21) Appl. No.: 18/009,092

(22) PCT Filed: May 18, 2021

(86) PCT No.: PCT/JP2021/018798
§ 371 (c)(1),
(2) Date: Dec. 8, 2022

(87) PCT Pub. No.: WO2021/251073
PCT Pub. Date: Dec. 16, 2021

(65) Prior Publication Data
US 2023/0318490 A1 Oct. 5, 2023

(30) Foreign Application Priority Data

Jun. 11, 2020 (JP) .................. 2020-101365

(51) Int. Cl.
*H02N 1/00* (2006.01)
(52) U.S. Cl.
CPC .............. *H02N 1/006* (2013.01); *H02N 1/00* (2013.01); *H02N 1/002* (2013.01); *H02N 1/008* (2013.01)

(58) Field of Classification Search
CPC ....... B32B 27/36; B32B 15/09; B32B 27/325; B32B 15/08; B32B 15/20; B32B 27/08;
(Continued)

(56) References Cited

U.S. PATENT DOCUMENTS 6,646,364 B1 * 11/2003 Horning ................. H02N 1/006
310/309
2008/0226878 A1 * 9/2008 Benslimane ........... H10N 30/05
204/192.15
2018/0294743 A1 10/2018 Saneyoshi et al.

FOREIGN PATENT DOCUMENTS

JP     09-233858     9/1997
JP     2007-259663   10/2007
(Continued)

OTHER PUBLICATIONS

ISA; International Search Report dated Jul. 20, 2021 in PCT/JP2021/018798.

*Primary Examiner* — Alexander A Singh
(74) *Attorney, Agent, or Firm* — SNELL & WILMER L.L.P.

(57) ABSTRACT

To provide a simply-structured multilayer electrostatic actuator that exhibits a sufficient stroke and a sufficient contraction force in a specific drive range, and rapidly hardens upon an attempt to widen the interval between electrodes beyond the drive range. A multilayer electrostatic actuator (1) is configured by a plurality of actuator parts (2a, 2b, 2c) each including: a first film ($3a_1$, $3b_1$, $3c_1$) having a plurality of first connection regions ($7a_1$, $7b_1$, $7c_1$) formed on one surface in a predetermined pattern; and a second film ($3a_2$, $3b_2$, $3c_2$) connected to the first film via the first connection regions, and having a plurality of second connection regions ($7a_2$, $7b_2$, $7c_2$) formed on a surface opposite to the first film in the identical pattern. The actuator parts are connected and layered via the second connection regions.

(Continued)

On both the first film and the second film of one actuator part (2a, 2b, 2c), a non-connection region (15) is formed having a substantially fixed width between connection regions adjacent to each other as viewed in a layering direction (Z). The first connection regions and the second connection regions are arranged so as not to overlap each other as viewed in the layering direction. Axes of the patterns between two actuator parts (2a, 2b; 2b, 2c) connected intersect each other at a predetermined angle (θ, except θ=0°) as viewed in the layering direction. When the multilayer electrostatic actuator is pulled in the layering direction due to an external force, the non-connection region, in particular mainly the non-connection region of the second film, is bending-deformed to separate the first film and the second film, resulting in the multilayer electrostatic actuator extending in the layering direction. Further pulling makes the non-connection region tensile-deformed and hardened. When a voltage is applied, the multilayer electrostatic actuator contracts in the layering direction due to the electrostatic attractive force.

13 Claims, 10 Drawing Sheets

(58) Field of Classification Search
CPC ............... B32B 3/28; B32B 2307/206; B32B 2307/202; H02N 1/006; H02N 1/008; H02N 1/00; H02N 1/002; H02N 1/004; B62B 27/283; B62B 2457/00
USPC .......................................................... 310/309
See application file for complete search history.

(56) References Cited

FOREIGN PATENT DOCUMENTS

| | | |
|---|---|---|
| JP | 2010-57321 | 3/2010 |
| JP | 2013-17287 | 1/2013 |
| JP | 2017-22926 | 1/2017 |
| JP | 2019-187038 | 10/2019 |

* cited by examiner

FIG. 7-1
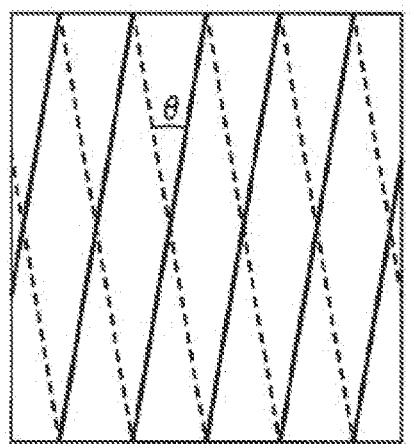
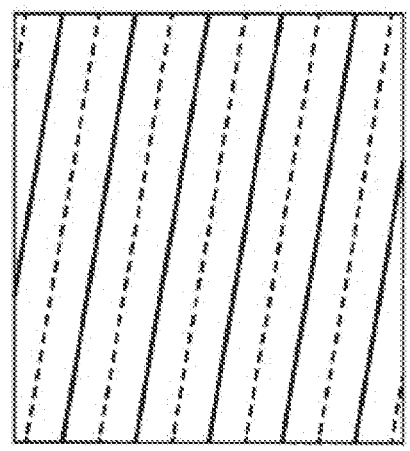
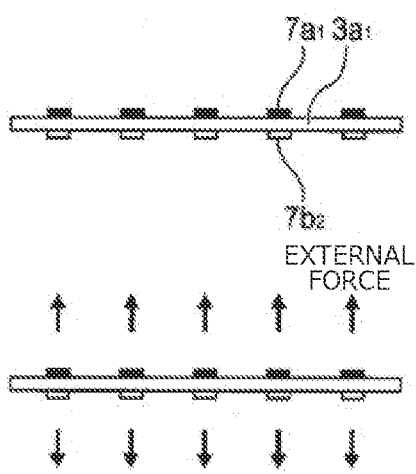
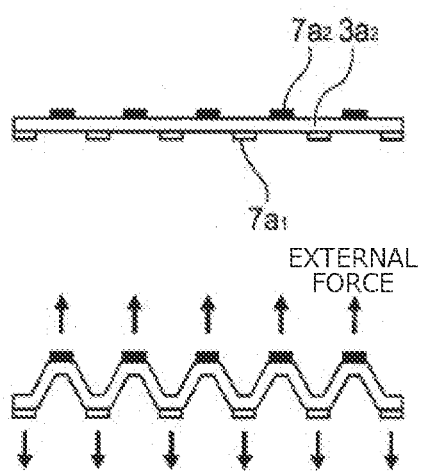

MULTILAYER ELECTROSTATIC ACTUATOR

CROSS-REFERENCE TO RELATED APPLICATIONS

This application is a national stage application of PCT/JP2021/018798, filed on May 18, 2021, entitled "LAMINATED-TYPE ELECTROSTATIC ACTUATOR," which claims priority to JP Application No. 2020-101365, filed on Jun. 11, 2020, both of which are hereby incorporated by reference in their entirety for all purposes.

TECHNICAL FIELD

The present invention relates to a multilayer electrostatic actuator.

BACKGROUND ART

A disclosed technique related to a multilayer electrostatic actuator (PTL 1, FIGS. 6 and 7) is designed to provide an electrostatic actuator having a stabilized overall shape in which high reproducibility can be attained for relation of input and output and a large electrostatic force and a large displacement can be obtained. Specifically, in this multilayer electrostatic actuator, a plurality of planar electrodes facing each other are layered integrally with a planar dielectric interposed therebetween and having an elastic modulus reduced by including a space continuous to the sidewall. The layered electrodes are connected electrically such that a first potential and a second potential are applied alternately, and the distance between the electrodes varies depending on the potential between the electrodes.

CITATION LIST

Patent Literature

PTL 1: JP 2007-259663 A

SUMMARY OF INVENTION

Technical Problem

It is known that a multilayer electrostatic actuator in which a "polymer material sheet having a dogleg cross section" or a "polymer material tube (cylindrical shape)" is employed as a dielectric placed between electrodes is advantageous in that it shows a large amount of deformation when electrostatic force acts on the dielectric because the bending elastic modulus of the structure is smaller than the longitudinal elastic modulus (Young's modulus) of the material body.

However, the multilayer electrostatic actuator having such a structure is problematic in terms of manufacturing because it is difficult to place a member having a "dogleg structure" or a "cylindrical structure" between electrodes. In addition, these structures are also problematic in that it is impossible to obtain nonlinear spring characteristics that exhibit soft deformation in a specific drive range (drive range of the actuator) and rapid hardening upon an attempt to widen the interval between electrodes beyond this range. That is, the spring constant of these structures does not change significantly until the structures are fully extended, and the connection portion with electrodes is greatly deformed in the fully extended state; therefore, the connection portion may be damaged due to stress concentration. Thus, the conventional structures have a trade-off relationship between stroke and generated force.

An object of the present invention is to provide a simply-structured multilayer electrostatic actuator having spring characteristics (hereinafter referred to as "suitable nonlinear spring characteristics") that exhibit a sufficient stroke and a sufficient contraction force that is derived from the electrostatic attractive force in a specific drive range when the multilayer electrostatic actuator is pulled in the layering direction, and rapid hardening upon an attempt to widen the interval between electrodes beyond the drive range.

Solution to Problem

In order to solve the above problem, the multilayer electrostatic actuator according to claim 1 is
a multilayer electrostatic actuator (1) including a plurality of actuator parts (2a, 2b, 2c) layered, the actuator parts each including:
a first film ($3a_1$, $3b_1$, $3c_1$) having a plurality of first connection regions ($7a_1$, $7b_1$, $7c_1$) formed on one surface in a pattern predetermined; and
a second film ($3a_2$, $3b_2$, $3c_2$) connected to the first film via the first connection regions, and having a plurality of second connection regions ($7a_2$, $7b_2$, $7c_2$) formed on a surface opposite to the first film in a pattern identical to the pattern of the first connection regions, in which
on both the first film and the second film, a non-connection region (15) is formed having a substantially fixed width between connection regions adjacent to each other as viewed in a layering direction (Z),
the first connection regions and the second connection regions of each of the actuator parts are arranged so as not to overlap each other as viewed in the layering direction,
two actuator parts (2a, 2b; 2b, 2c) overlapping each other among the actuator parts are connected via the second connection regions (7b2, 7c2), and
the two actuator parts (2a, 2b; 2b, 2c) connected are layered such that axes of the patterns between the two actuator parts intersect each other at an angle (θ, except θ=0°) predetermined as viewed in the layering direction.

The multilayer electrostatic actuator according to claim 2 is based on the multilayer electrostatic actuator according to claim 1, and characterized in that
in each of the actuator parts, axes of the pattern of the first connection regions are parallel to each other, and axes of the pattern of the second connection regions are parallel to each other,
which is preferable in that the pattern interval of the first connection regions and the second connection regions can be easily controlled, and thus the stability of the structure is improved and the life can be prolonged. In addition, the manufacturability is also improved.

The multilayer electrostatic actuator according to claim 3 is based on the multilayer electrostatic actuator according to claim 1 or 2, and characterized in that
in each of the actuator parts, axes of the pattern of the second connection regions are parallel to axes of the pattern of the first connection regions,
which is preferable in that the pattern interval of the first connection regions and the second connection regions can be easily controlled, and thus the stability of the structure is improved and the life can be prolonged. In addition, the manufacturability is also improved.

The multilayer electrostatic actuator according to claim 4 is based on the multilayer electrostatic actuator according to any one of claims 1 to 3, and characterized in that the patterns of the first connection regions and the second connection regions both form linear shapes having a substantially uniform width and arranged at equal intervals, which is preferable in that the first connection regions and the second connection regions can be easily manufactured, and thus the stability of the structure can be improved.

The multilayer electrostatic actuator according to claim 5 is based on the multilayer electrostatic actuator according to any one of claims 1 to 4, and characterized in that in each of the actuator parts, one of the first connection regions is positioned at a center of the non-connection region between two of the second connection regions as viewed in the layering direction, whereby the stress generated in the non-connection region during extension and contraction is averaged, and stress concentration is less likely to occur. This is preferable in that the life of the multilayer electrostatic actuator can be prolonged.

The multilayer electrostatic actuator according to claim 6 is based on the multilayer electrostatic actuator according to any one of claims 1 to 5, and characterized in that when a plane formed by the two actuator parts layered is viewed in the layering direction, axes of the pattern of the first connection regions ($7a_1$; $7b_1$) in the actuator part ($2a$; $2b$) in an upper layer intersect axes of the pattern of the second connection regions ($7b_2$; $7c_2$) in the actuator part ($2b$; $2c$) in a lower layer at at least one point, which is preferable in that the intersection on the plane makes the first film of the actuator part in the upper layer less likely to be deformed, and causes the non-connection region of the second film to be mainly elastically deformed, and thus suitable nonlinear spring characteristics can be obtained between the films.

The multilayer electrostatic actuator according to claim 7 is based on the multilayer electrostatic actuator according to claim 6, and characterized in that the patterns of the first connection regions and the second connection regions both form linear shapes having a substantially uniform width (d) and arranged at equal intervals, and given that a length, on the plane as viewed in the layering direction, of the axes of the pattern of one of the first connection regions of the actuator part in the upper layer and the second connection regions of the actuator part in the lower layer is L, and a width between the non-connection regions in the one connection regions as viewed in the layering direction is 2×l+d, the angle θ [rad] of intersection of the axes of the patterns between the two actuator parts connected as viewed in the layering direction satisfies $$\arctan\left(\frac{2 \times l + d}{L}\right) < |\theta| \le \frac{\pi}{2}, \qquad \text{[Formula 1]}$$

which is preferable in that the intersection can be reliably realized on the plane, and thus the multilayer electrostatic actuator can obtain more suitable nonlinear spring characteristics.

The multilayer electrostatic actuator according to claim 8 is based on the multilayer electrostatic actuator according to any one of claims 1 to 7, and characterized in that when the multilayer electrostatic actuator extends:

the first film and the second film in each of the actuator parts are separated from each other to form a space (13) in the non-connection region of the first film and the second film; and the first film of the actuator part in an upper layer and the second film of the actuator part in a lower layer are separated from each other to form a space (11) in the non-connection region of the first film and the second film, the two spaces (11, 13) are in fluid communication with outside, and fluid is allowed to flow in and out between the spaces and outside when the multilayer electrostatic actuator extends and contracts, which is preferable in that fluid can freely enter and exit the spaces formed in the non-connection regions during extension and contraction, and the responsiveness is improved.

The multilayer electrostatic actuator according to claim 9 is based on the multilayer electrostatic actuator according to any one of claims 1 to 8, and characterized in that a planar shape of the actuator parts is a quadrangle, and the two actuator parts overlapping each other are layered at the angle of intersection predetermined of 90°, which is preferable in that the first film that is least likely to be deformed is obtained with the simple shape, and the effect of a high-order component (third-order component) is enhanced in the spring force in the non-connection region of the second film, so that more suitable nonlinear spring characteristics can be obtained. This improves the characteristics of the actuator.

The multilayer electrostatic actuator according to claim 10 is based on the multilayer electrostatic actuator according to any one of claims 1 to 9, and characterized in that the first film includes a three-layer structure of an insulating layer (23), a conductive layer (21), and an insulating layer (23), the second film is configured by an insulating layer, the second film has, as viewed in the layering direction, a first connection surface portion ($8_1$) connected to the first film via the first connection regions, a second connection surface portion ($8_2$) connected to the first film of the actuator part on an upper side in the layering direction via the second connection regions, and a hinge portion (15) in which neither the first connection regions nor the second connection regions are formed, when the multilayer electrostatic actuator is pulled in the layering direction due to an external force, the hinge portion is elastically deformed to separate the first film and the second film, and the multilayer electrostatic actuator extends in the layering direction, and when a voltage is applied between the first films of the two actuator parts layered, the two first films are attracted to each other due to an electrostatic attractive force, and the multilayer electrostatic actuator contracts in the layering direction, which is preferable in that the conductive layer included in the first film is less likely to be deformed, so that no electrical disconnection occurs in the conductive layer due to film deformation, and the life of the multilayer electrostatic actuator can be prolonged.

The multilayer electrostatic actuator according to claim 11 is based on the multilayer electrostatic actuator according to any one of claims 1 to 9, and characterized in that both the first film and the second film include a three-layer structure of an insulating layer (23), a conductive layer (21), and an insulating layer (23), the second film has a first connection surface portion ($8_1$) connected to the first film via the first connection regions, a second connection surface portion ($8_2$) connected to the first film of the actuator part on an upper side in the layering direction via the second connection regions, and a hinge portion (15) in which neither the first connection regions nor the second connection regions are formed, when the multilayer electrostatic actuator is pulled in the layering direction due to an external force, the hinge portion is elastically deformed to separate the first film and the second film, and the multilayer electrostatic actuator extends in the layering direction, and when a voltage is applied between the first film and the second film, the two films are attracted to each other due to an electrostatic attractive force, and the multilayer electrostatic actuator contracts in the layering direction, which is preferable in that the first film and the second film are densely layered and the interval between electrodes is narrowed, so that the force of attracting each other due to the electrostatic attractive force is improved.

The multilayer electrostatic actuator according to claim 12 is based on the multilayer electrostatic actuator according to claim 11, and characterized in that the first film and the second film have an elongated ribbon shape, the multilayer electrostatic actuator has a paper spring structure in which two first films and two second films are bent in a zigzag shape and alternately folded such that longitudinal directions of the first films and the second films intersect each other at 90° as viewed in the layering direction, on a plane where the two first films and the two second films overlap each other as viewed in the layering direction, a plurality of the actuator parts layered are formed, and a bent portion formed outside the plane constitutes an outer hinge portion (17), and the first films or the second films of the actuator parts in different layers are integrated with each other by the outer hinge portion, which is preferable in that the simple way of manufacturing in which the actuator parts having an elongated ribbon shape are folded improves the manufacturability. In addition, the configuration in which the first films or the second films of the actuator parts are electrically connected to each other by the outer hinge portion is preferable in that post-assembly wiring for each layer is unnecessary, and the manufacturability is improved. Furthermore, the outer hinge portion functions as a semi-cylindrical structure that suppresses the deformation of the bent portion of the first films and the second films in a direction parallel to the plane. This allows the distance between the films to be uniform even in the bent portion, where the distance between the films tends to be uneven. This is preferable in that the movement in the layering direction is made stable and uniform, and the driving force can be improved.

The multilayer electrostatic actuator according to claim 13 is based on the multilayer electrostatic actuator according to claim 11, and characterized in that the first film and the second film have an elongated ribbon shape, the multilayer electrostatic actuator has a flat spiral wound structure in which two first films and two second films are wound in one direction from a center.

on a plane where the two first films and the two second films overlap each other as viewed in the layering direction, a plurality of the actuator parts layered are formed, and a bent portion formed outside the plane constitutes an outer hinge portion (17), and the first films or the second films of the actuator parts in different layers are integrated with each other by the outer hinge portion, which is preferable in that the simple way of manufacturing in which the actuator parts having an elongated ribbon shape are wound improves the manufacturability. In addition, the configuration in which the first films or the second films of the actuator parts are electrically connected to each other by the outer hinge portion is preferable in that post-assembly wiring for each layer is unnecessary, and the manufacturability is improved. Furthermore, the outer hinge portion functions as a semi-cylindrical structure that suppresses the deformation of the bent portion of the first films and the second films in a direction parallel to the plane. This allows the distance between the films to be uniform even in the bent portion, where the distance between the films tends to be uneven. This is preferable in that the movement in the layering direction is made stable and uniform, and the driving force can be improved.

Advantageous Effects of Invention

According to the present invention, while the non-connection region of the second film is likely to be elastically deformed in each actuator part, the first film is less likely to be deformed because the axes of the patterns of the first and second connection regions connected thereto intersect each other at a predetermined angle as viewed in the layering direction. Therefore, when the multilayer electrostatic actuator is pulled in the layering direction due to an external force, each actuator part is softly deformed in a small drive range of the second film, but further deformation beyond the small drive range results in a rapid increase in the spring constant of the second film due to the rigidity of the first film, which makes each actuator part hardened rapidly. Consequently, it is possible to suppress excessive extension of the distance between the films in each actuator part of the multilayer electrostatic actuator, and a sufficient contraction force that is derived from the electrostatic attractive force is exerted. In other words, while a sufficiently large stroke is obtained even under a weak external force that pulls in the layering direction, the interval between films does not excessively increase under a strong external force. The amount of stroke is unlikely to depend on the external force. Therefore, when a voltage is applied between films to generate an electrostatic attractive force, a sufficient contraction force can be secured. That is, it is possible to achieve the provision of the multilayer electrostatic actuator having nonlinear spring characteristics with respect to displacement.

Furthermore, it is possible to obtain desired nonlinear spring characteristics in the simple way in which the axes of the patterns of the connection regions formed on the films intersect each other at a predetermined angle (θ, except θ=0°) as viewed in the layering direction. Consequently, the patterns of the connection regions can be easily controlled, the stability of the structure is improved, the life can be prolonged, and the manufacturability is also improved.

BRIEF DESCRIPTION OF DRAWINGS

FIG. 7-1 is an explanatory diagram for explaining the overlapping state of two actuator parts of the multilayer electrostatic actuator according to another embodiment, where (a) is a view as viewed in the layering direction, and (b) is a cross-sectional view taken along VII-VII in (a).

FIG. 7-2 is an explanatory diagram for explaining the intersection condition for the connection regions in the multilayer electrostatic actuator illustrated in FIG. 7-1.

DESCRIPTION OF EMBODIMENTS

Hereinafter, the configurations, manners of operation, and effects of the multilayer electrostatic actuator according to the present embodiment will be described in detail with reference to the embodiments illustrated in FIGS. 1 to 9. In the following description, first, the basic structure of the multilayer electrostatic actuator according to the present embodiment will be described, and next, components of the multilayer electrostatic actuator will be described in detail. Then, the manners of operation of the multilayer electrostatic actuator will be described, and further, the relationship between the generated force of the multilayer electrostatic actuator and the resultant force of the electrostatic force and the spring force will be mentioned. Next, two types of application examples of multilayer electrostatic actuators having a function of connecting electrodes of different layers will be described, and effects of the multilayer electrostatic actuators will be mentioned. Finally, other embodiments of multilayer electrostatic actuators that partially differ in configuration will be briefly described.

First Embodiment (1-1) Basic Structure of Multilayer Electrostatic Actuator

Figure 1:
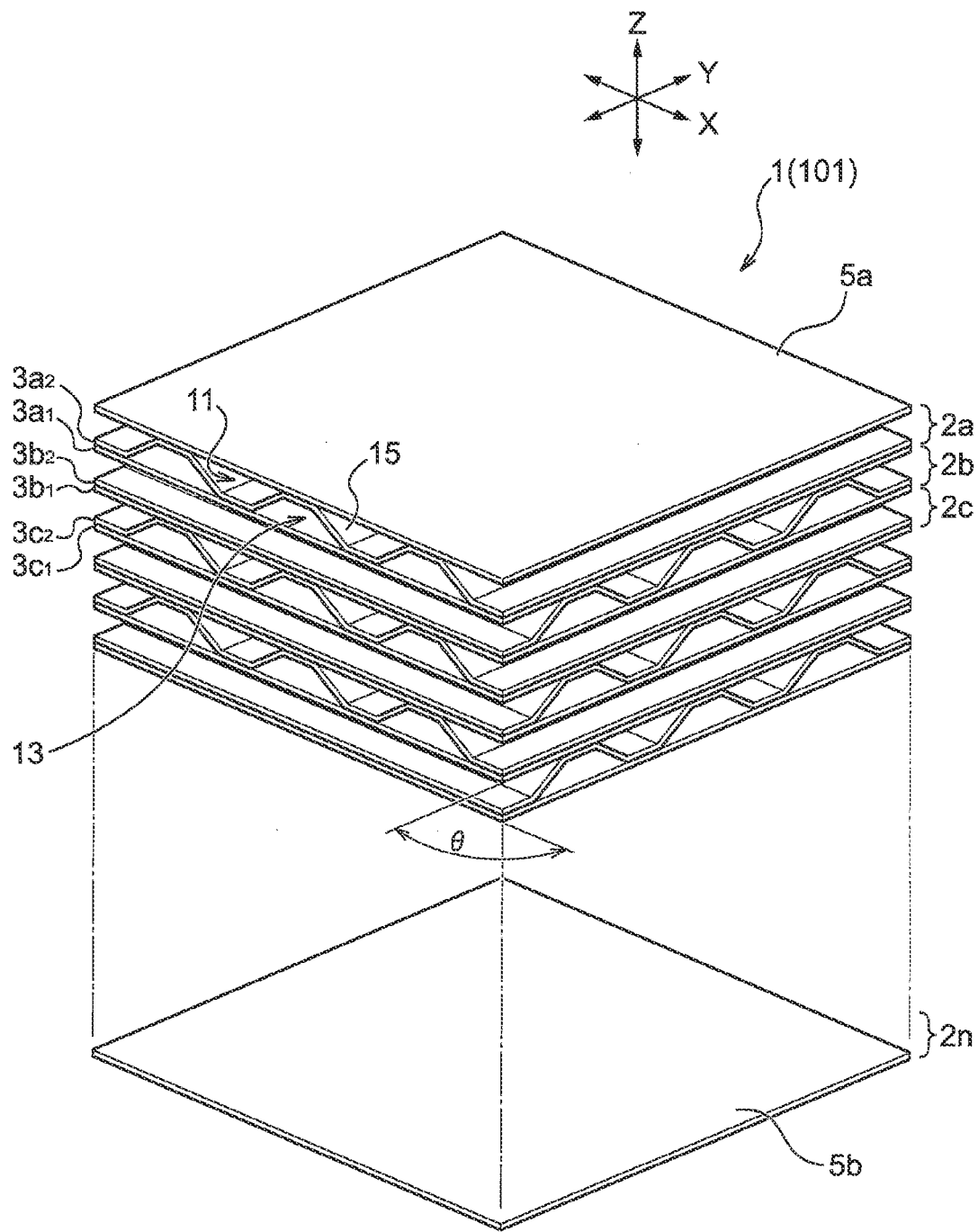
FIG. 1 is a perspective view illustrating the basic structure of a multilayer electrostatic actuator according to the present embodiment.
Figure 2:
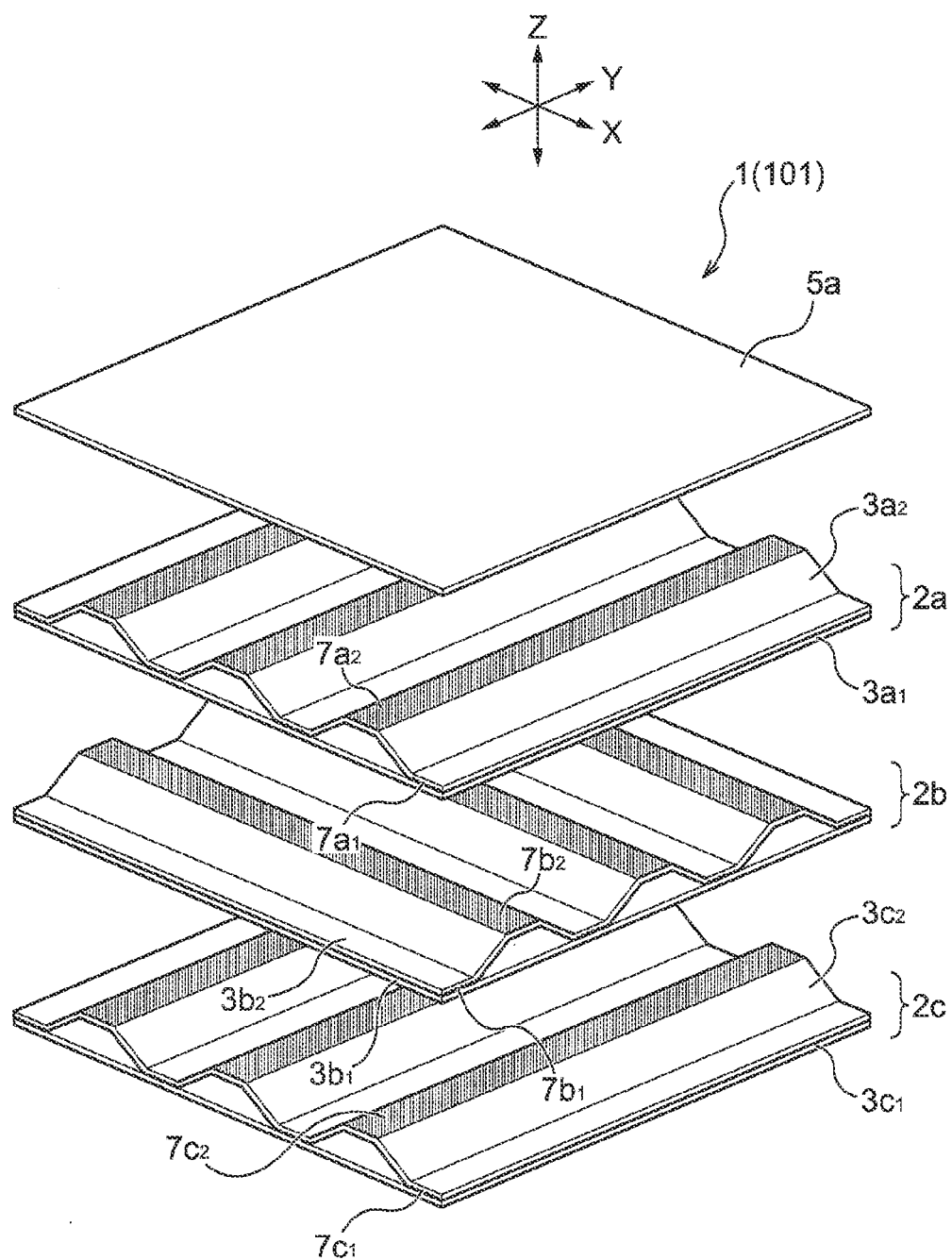
FIG. 2 is an exploded perspective view illustrating a portion of the basic structure of the actuator part illustrated in FIG. 1.

FIG. 1 is a perspective view illustrating the basic structure of a multilayer electrostatic actuator according to the first embodiment, and FIG. 2 is an exploded perspective view illustrating a portion of the basic structure of the actuator part of the multilayer electrostatic actuator illustrated in FIG. 1. As illustrated in FIG. 1, the multilayer electrostatic actuator 1 includes a plurality of actuator parts $2a$, $2b$, $2c$ . . . , $2n$ (hereinafter may be referred to as the "actuator part 2") layered and sandwiched between end members $5a$, $5b$ located on the upper and lower surfaces in the layering direction Z. Each of the actuator parts $2a$, $2b$, $2c$ has a planar shape that is quadrangular as viewed in the layering direction Z. As illustrated in FIG. 2, the actuator parts $2a$, $2b$, $2c$ respectively include first films $3a_1$, $3b_1$, $3c_1$ having a plurality of first connection regions $7a_1$, $7b_1$, $7c_1$ formed on one surface in a predetermined pattern, and second films $3a_2$, $3b_2$, $3c_2$ connected to the first films $3a_1$, $3b_1$, $3c_1$ via the first connection regions $7a_1$, $7b_1$, $7c_1$. The second films $3a_2$, $3b_2$, $3c_2$ respectively have a plurality of second connection regions $7a_2$, $7b_2$, $7c_2$ formed on the surface opposite to the first films $3a_1$, $3b_1$, $3c_1$ in a pattern identical to the pattern of the first connection regions $7a_1$, $7b_1$, $7c_1$. Two actuator parts $2a$, $2b$; $2b$, $2c$ overlapping each other are respectively connected via the second connection regions $7b_2$; $7c_2$, and the actuator part $2a$ is connected to the end member $5a$ located on the uppermost surface in the layering direction Z via the second connection regions $7a_2$.

Here, the first connection regions $7a_1$ are formed in linear shapes having a uniform width, and the plurality of first connection regions $7a_1$ are arranged on the first film $3a_1$ in parallel to each other at equal intervals. Similarly, the first connection regions $7b_1$ are also formed in linear shapes having a uniform width, and the plurality of first connection regions $7b_1$ are arranged on the first film $3b_1$ in parallel to each other at equal intervals. The first connection regions $7c_1$ are also formed in linear shapes having a uniform width, and the plurality of first connection regions $7c_1$ are arranged on the first film $3c_1$ in parallel to each other at equal intervals. In addition, the second connection regions $7a_2$, $7b_2$, $7c_2$ are formed in the linear pattern identical to the linear pattern of the first connection regions $7a_1$, $7b_1$, $7c_1$, respectively, and the plurality of second connection regions $7a_2$, $7b_2$, $7c_2$ are arranged on the second films $3a_2$, $3b_2$, $3c_2$ in parallel to each other at equal intervals. The linear pattern of the plurality of first connection regions $7a_1$ and the linear pattern of the plurality of second connection regions $7a_1$ are arranged so as not to overlap each other as viewed in the layering direction Z. The connection regions $7b$, $7e$ are also arranged similarly. Therefore, on both the first films $3a_1$, $3b_1$, $3c_1$ and the second films $3a_2$, $3b_2$, $3c_2$, a non-connection region 15 is formed having a linear shape and a substantially fixed width at the center between connection regions adjacent to each other as viewed in the layering direction Z.

The actuator parts $2a$, $2b$, $2c$ having such a configuration are layered at an intersection angle θ of 90°. Consequently, in the multilayer electrostatic actuator 1, as illustrated in FIG. 1, the actuator part $2a$ of the first stage is provided under the end member $5a$ placed on the uppermost surface in the layering direction Z, and the actuator part $2b$ of the second stage is provided under the actuator part $2a$ with an angle difference of 90°. Similarly, the actuator parts $2c$ to $2n$ of the third to n-th stages are sequentially provided with an angle difference of 90°, and the end member $5b$ is placed on the lowermost surface in the layering direction Z, whereby the multilayer electrostatic actuator 1 is formed.

Here, the term "having a substantially fixed width" as used in this context in the present specification is intended to mean not only that the width of the non-connection region formed between connection regions is fixed as viewed in the layering direction Z, but also that the width can fluctuate in the range of about ±5 to 10% for manufacturing or other purposes. Although the first embodiment describes the case where the intersection angle θ is 90° as an example, the present invention is not limited thereto. For example, it is intended to include any angle other than 0° such as 60° or 72° (strictly, the acute angle portion between axes satisfies 0°<θ≤90° (including a right angle)).

(1-2) Components of Multilayer Electrostatic Actuator
<Film>

Figure 3:
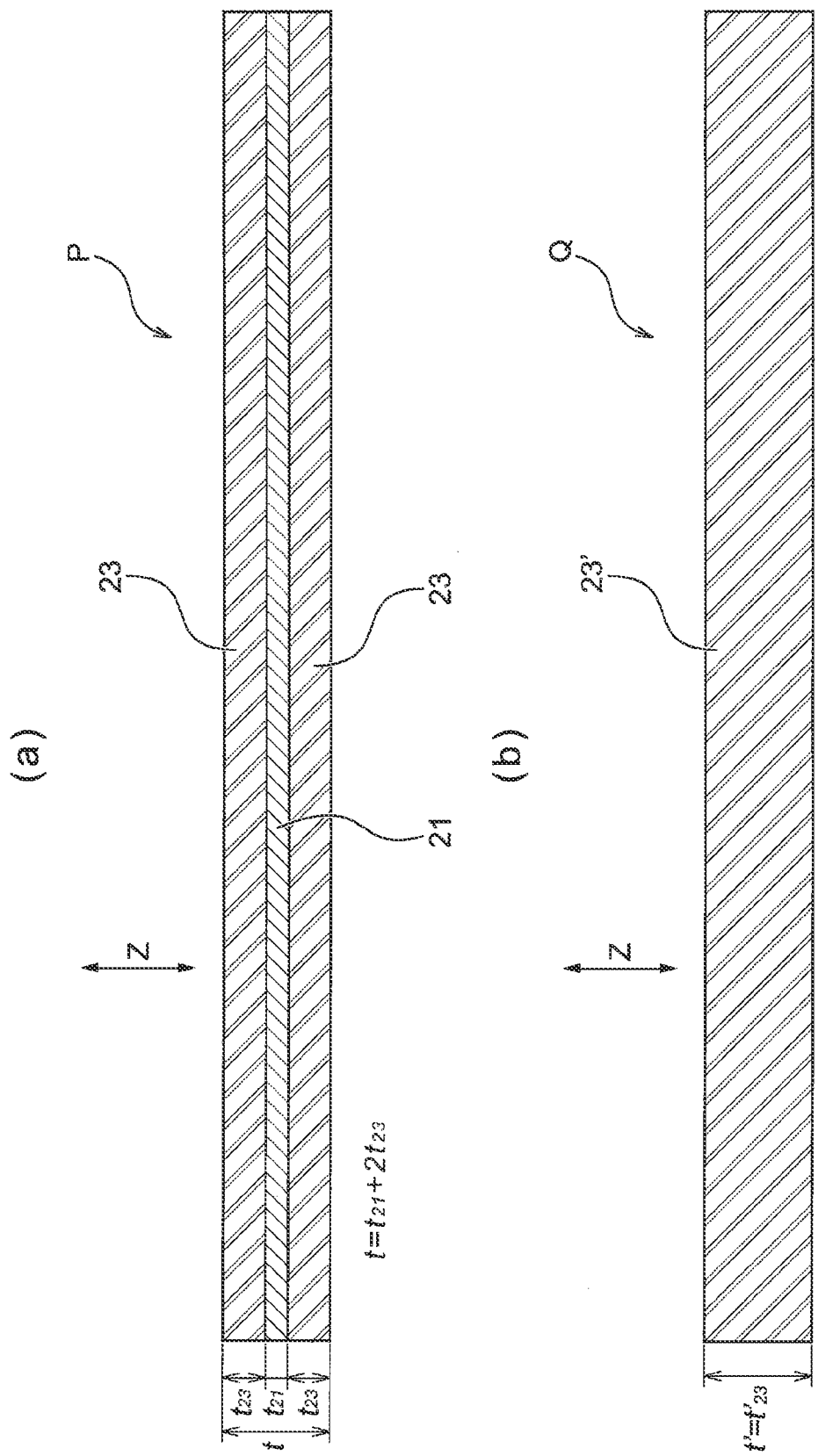
FIG. 3 is a cross-sectional view illustrating the layered structure of the films of the actuator part illustrated in FIG. 2.

FIG. 3 is a cross-sectional view illustrating the layered structure of the films of the actuator part illustrated in FIG. 2. FIG. 3a illustrates the layered structure of the first films $3a_1$, $3b_1$, $3c_1$ (hereinafter referred to as the "conductive film P") of the actuator parts 2a, 2b, 2c, and FIG. 3b illustrates the layered structure of the second films $3a_2$, $3b_2$, $3c_2$ (hereinafter referred to as the "insulating film Q").

The conductive film P has a three-layer film structure including a conductive layer 21 at the center and insulating layers 23 on the front and back surfaces thereof, for example. The conductive layer 21 can be exemplified by a metal film such as copper (Cu) or aluminum (Al), a conductive polymer, or a conductive carbon allotrope (or a conductive mixture mainly composed of carbon). The insulating layer 23 can be exemplified by, but is not limited to, an insulating polymer film such as polyethylene terephthalate (PET), Kapton, parylene (registered trademark), a silicon-based material, or a carbon-based material. Here, given that the thickness of the conductive layer 21 is $t_{21}$ and the thickness of the insulating layer 23 is $t_{23}$, the thickness t of the conductive film P is $t=t_{21}+2\times t_{23}$. The thickness t of the conductive film P is, for example, several micrometers. Note that the three-layer film structure of the conductive film P is merely an example. In another example, the conductive layer 21 may have a multilayer structure made of dissimilar conductors having a plurality of different electrical conductivities and/or Young's moduli, and the insulating layer 23 may have a multilayer structure made of dissimilar insulators having a plurality of different electrical resistivities and/or Young's moduli.

On the other hand, the insulating film Q does not have any conductive layer 21, and consists of an insulating layer 23'. The insulating layer 23' can be exemplified by, but is not limited to, an insulating polymer film such as polyethylene terephthalate (PET), Kapton, parylene (registered trademark), a silicon-based material, or a carbon-based material. In addition, the insulating layer 23' may have a single-layer structure made of a single material, or may have a multilayer structure made of dissimilar insulators having a plurality of different electrical resistivities and/or Young's moduli. Here, given that the thickness of the insulating layer 23' is $t_{23'}$, the thickness t' of the insulating film Q is $t'=t_{23'}$. The thickness t' of the insulating film Q is, for example, several micrometers.

<Connection Portion>

Figure 4:
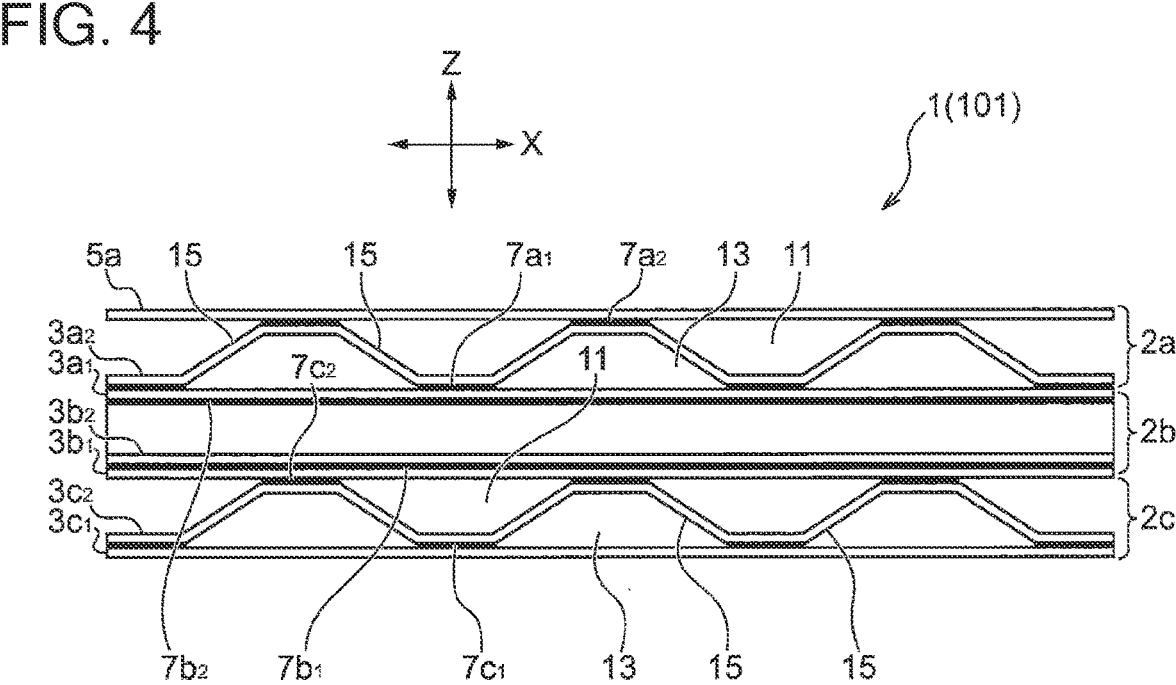
FIG. 4 is an enlarged front view illustrating a portion of the basic structure of the actuator part illustrated in FIG. 1.
Figure 5:
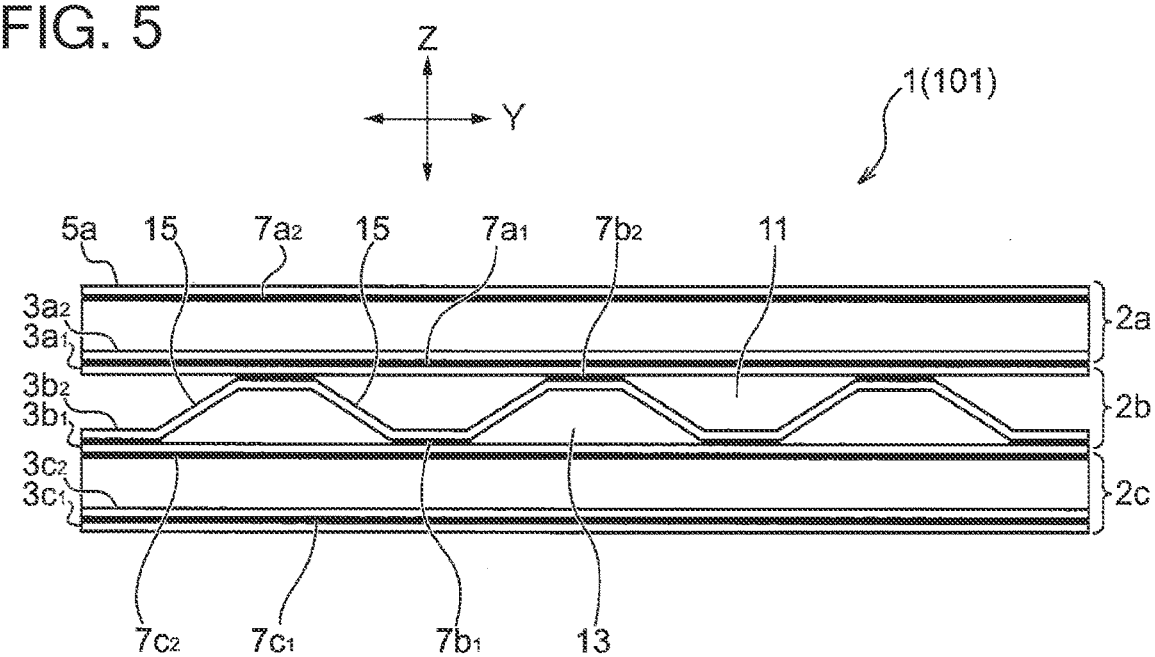
FIG. 5 is an enlarged side view illustrating a portion of the basic structure of the actuator part illustrated in FIG. 1.

FIG. 4 is an enlarged front view illustrating a portion of the basic structure of the actuator parts 2a, 2b, 2c illustrated in FIG. 1, and FIG. 5 is a corresponding side view. Both drawings indicate a state in which an external force acts between the two end members 5a, 5b (FIG. 1) to separate the end members 5a, 5b in the layering direction Z, and the interval between the first films $3a_1$, $3b_1$, $3c_1$ and the second films $3a_2$, $3b_2$, $3c_2$ is extended. Because the first connection regions and the second connection regions (hereinafter may be referred to as the "connection region 7") of each actuator part are separated from each other, a space 11, 13 is formed in the non-connection region 15 formed between the connection regions 7, 7 between upper and lower ones of the first films and second films layered.

More specifically, the plurality of first connection regions $7a_1$ of the actuator part 2a connect the first film $3a_1$ and the second film $3a_2$, and the space 13 is formed between adjacent first connection regions $7a_1$, $7a_1$ (FIG. 4). The plurality of second connection regions $7a_2$ connect the second film $3a_2$ and the end member 5a on the uppermost surface in the layering direction Z, and the space 11 is formed between adjacent second connection regions $7a_2$, $7a_2$. The first connection regions $7a_1$ are arranged so as not to overlap the second connection regions $7a_2$ as viewed in the layering direction Z. Specifically, the first connection regions $7a_1$ and the second connection regions $7a_2$ have linear shapes or band shapes extending in the depth direction Y and are arranged at equal intervals in the width direction X, and the first connection regions $7a_1$ and the second connection regions $7a_2$ are shifted by half a pitch in the width direction X so as to be positioned at the center of the space between counterpart connection regions. Similarly, the plurality of first connection regions $7c_1$ of the actuator part 2c connect the first film $3c_1$ and the second film $3c_2$, and the space 13 is formed between adjacent first connection regions $7c_1$, $7c_1$ (FIG. 4). The plurality of second connection regions $7c_2$ connect the second film $3c_2$ and the first film $3b_1$ of the actuator part 2b on the upper side in the layering direction Z, and the space 11 is formed between adjacent second connection regions $7c_2$, $7c_2$.

The plurality of first connection regions $7b_1$ of the actuator part 2b connect the first film $3b_1$ and the second film $3b_2$, and the space 13 is formed between adjacent first connection regions $7b_1$, $7b_1$ (FIG. 5). The second connection region $7b_2$ connect the second film $3b_2$ of the actuator part 2b and the first film 3ar of the actuator part 2a, and the space 11 is formed between adjacent second connection regions $7b_2$, $7b_2$. The first connection regions $7b_1$ are arranged so as not to overlap the second connection regions $7b_2$ as viewed in the layering direction Z. In addition, the first connection regions $7b_1$ and the second connection regions $7b_2$ have linear shapes or band shapes extending in the width direction X and are arranged at equal intervals in the depth direction Y, and the first connection regions $7b_1$ and the second connection regions $7b_2$ are shifted by half a pitch in the depth direction Y so as to be positioned at the center of the space between counterpart connection regions.

An example of the material for connecting the first film and the second film in the connection region 7 is an adhesive, which is applied with high accuracy so as to have a constant application thickness and a predetermined pattern using a method such as relief printing, offset printing, stencil printing, or inkjet printing to form an adhesive portion. Alternatively, a chemical bonding layer may be formed on the insulating layer 23 or 23' (FIG. 3) through chemical treatment such as surface treatment. In the case of forming an adhesive portion, the two films $3a_1$, $3a_2$ are bonded to each other via the adhesive. In the case of forming a bonding layer through chemical treatment, the two films $3a_1$, $3a_2$ are covalently bonded to each other. Other methods such as welding the insulating layer 23 or 23' can be used without limitation to form the connection region as long as the above-described coupling pattern can be formed.

<Hinge Portion>

As described above with reference to FIGS. 4 and 5, because the second film $3a_2$ is connected at its upper and lower surfaces to the first connection regions $7a_1$ and the second connection regions $7a_2$, respectively, the portions (hereinafter referred to as the "connection surface portions $8_1$, $8_2$" (FIG. 6)) of the second film $3a_2$ corresponding to the first connection regions $7a_1$ and the second connection regions $7a_2$ have higher rigidity than the portions of the second film $3a_2$ corresponding to the other regions (non-connection regions that do not contribute to connection, hereinafter referred to as the non-connection region 15). Similarly, the connection surface portions $8_1$, $8_2$ of the second film $3b_2$ corresponding to the first connection regions $7b_1$ and the second connection regions $7b_2$ have higher rigidity than the non-connection region 15 of the second film $3b_2$.

When a tensile force (external force) in a direction in which the two end members 5a, 5b (FIG. 1) are separated is applied in the layering direction Z, the non-connection regions 15 of the second film $3a_2$ of the actuator part 2a and the second film $3b_2$ of the actuator part 2b are elastically deformed, and the intervals $3a_1$-$3a_2$, $3b_2$-$3a_1$, $3b_1$-$3b_2$ between the first film and the second film are widened (FIGS. 4 and 5), resulting in the multilayer electrostatic actuator 1 extending in the layering direction Z (FIG. 1). A portion of the second film $3a_2$, $3b_2$ corresponding to the non-connection region 15 is defined as a "hinge portion 15".

When a voltage is applied between the first film $3a_1$ of the actuator part 2a and the first film $3b_1$ of the actuator part 2b, the interval between the first films $3a_1$, $3b_1$ returns to the initial state (described later) due to the electrostatic attractive force caused by the applied voltage, and the interval between the first films $3a_1$, $3b_1$ is narrowed. The gap between the other first films $3b_1$, $3c_1$ is similarly narrowed due to the electrostatic attractive force, resulting in the multilayer electrostatic actuator 1 contracting in the layering direction Z.

The first film $3a_1$ of the actuator part 2a is connected at its upper surface to the second film $3a_2$ in the first connection regions $7a_1$ and connected at its lower surface to the second film $3b_2$ in the second connection regions $7b2$. Because the first connection regions $7a_1$ extend in the depth direction Y and the second connection regions $7b_2$ extend in the width direction X, the second connection regions $7b_2$ act as ribs with respect to the deformation of the hinge portion 15 extending in the depth direction Y of the first film $3a_1$ of the actuator part 2a. Therefore, the first film $3a_1$ of the actuator part 2a has higher rigidity than the second film $3a_2$. Thus, when a tensile force (external force) is applied to the multilayer electrostatic actuator 1 in the layering direction Z, the hinge portion 15 of each of the second film $3a_2$ of the actuator part 2a and the second film $3b_2$ of the actuator part 2b is elastically deformed (bent and extended), but the elastic deformation of the first film $3a_1$ of the actuator part 2a is suppressed due to the above-described structure.

In the case where the deformation of the first film $3a_1$, $3b_1$ is suppressed and only the hinge portion 15 of the second film $3a_2$, $3b_2$ is deformed, the movement in the width direction X and the depth direction Y at the boundary position O (FIG. 6) between the hinge portion 15 and the connection surface portion $8_1$, $8_2$ on the second film $3a_2$, $3b_2$ is restrained. When the hinge portion 15 is deformed under such a restraint condition, the area near the boundary position O of the second film $3a_2$, $3b_2$ is mainly shear-deformed or bending-deformed so that the hinge portion 15 behaves like a soft spring: however, when an external force is applied in an attempt to cause further deformation, the hinge portion 15 is inclined in the layering direction Z, and the hinge portion 15 is tensile-deformed to behave like a hard spring. For this reason, in the small deformation range in which the multilayer electrostatic actuator 1 starts to extend in the layering direction Z from the initial state before external force application, the hinge portion 15 is soft, and the gap between the first films $3a_1$, $3b_1$ is likely to be widened in response to the external force. On the other hand, upon an additional external force applied in an attempt to cause further deformation, the hinge portion 15 rapidly becomes hard, which makes the gap between the first films $3a1$, $3b_1$ less likely to be widened rapidly.

In other words, the spring constant of the hinge portion 15 of each actuator part 2a, 2b is small in the small deformation range of the multilayer electrostatic actuator 1 so that the actuator part 2a, 2b is softly deformed, whereas an attempt to cause further deformation beyond the small deformation range results in a rapid increase in the spring constant of the second film $3a_2$, $3b_2$, which makes each actuator part 2a, 2b less likely to be deformed rapidly. That is, the multilayer electrostatic actuator 1 has nonlinear spring characteristics in each actuator part 2a, 2b, which makes it possible to suppress excessive extension of the distance between films, in particular the distance between the first films $3a_1$, $3b_1$, and to obtain a sufficient electrostatic attractive force.

For the above reason, when a tensile force (external force) is applied to the multilayer electrostatic actuator 1 in the layering direction Z, the second film $3a_2$, $3b_2$ is elastically deformed in the actuator part 2a, 2b, and the multilayer electrostatic actuator 1 is put into the extended state. At this time, the deformation of the first film $3a_1$ is suppressed. When a voltage is applied to the multilayer electrostatic actuator 1 in the extended state, an electrostatic attractive force acts between the first film $3a_1$ of the actuator part 2a and the first film $3b_1$ of the actuator part 2b, and the interval between the first films $3a1$, $3b_1$ is narrowed. As a result, the multilayer electrostatic actuator 1 contracts in the layering direction Z. Conversely, when the voltage is turned to zero, the non-connection region 15 of each of the second film $3a_2$ of the actuator part 2a and the second film $3b_2$ of the actuator part 2b is elastically deformed due to the external force, and the intervals $3a_1$-$3a_2$, $3b_2$-$3a_1$, $3b_1$-$3b_2$ between the first film and the second film are widened, resulting in the multilayer electrostatic actuator 1 extending in the layering direction Z. Thus, the multilayer electrostatic actuator 1 can be extended and contracted by turning on/off the applied voltage.

<Space>

When a tensile force (external force) in the layering direction Z is applied to the multilayer electrostatic actuator 1 and the multilayer electrostatic actuator 1 is put into the extended state, the second film $3a_2$, $3b_2$ undergoes an increase in the space 11 with respect to the upper layer (the end member 5a on the uppermost surface in the layering direction Z and the first film $3a_1$ of the actuator part 2a, respectively) and an increase in the space 13 with respect to the lower layer (first film $3a_1$, $3b_1$, respectively) (FIGS. 4 and 5). These spaces 11, 13 are in fluid communication with outside in order to secure a sufficient amount of extension and contraction without hindering the extension and contraction operation of the multilayer electrostatic actuator 1 described below, and function as an insulating fluid portion through which an insulating fluid passes. In addition, the opening areas of these spaces 11 and 13 vary depending on the difference between the extension and contraction of the actuator part 2a, 2b. That is, when a tensile force (external force) in the layering direction Z is applied, mainly the second film is elastically deformed, and the interval between first films is separated, resulting in an increase in the opening area of the space 11, 13; whereas when a voltage is applied between electrode layers to cause an electrostatic attractive force, the interval between first films is narrowed, resulting in a decrease in the opening area of the space 11, 13.

(1-3) Manner of Operation of Multilayer Electrostatic Actuator

In the multilayer electrostatic actuator 1 having the above configuration, the extension/contraction state varies depending on whether a tensile force (external force) is applied in the layering direction Z and whether a voltage is applied between first films.

<Initial State (Contracted State)>

In the initial state or when a voltage is applied between first films after application of a tensile force (external force) in the layering direction Z and an electrostatic attractive force acts and balances, the hinge portion 15 is not deformed, and the first film $3a_1$ and the second film $3a_2$ are in a planar state. At this time, the distance u from the conductive layer 21 of the first film $3a_1$ to the conductive layer 21 of the first film $3b_1$ (FIG. 3) is $u_{initial}=2\times t_{23}+t_{23'}$ (not illustrated).

<Extended State>

Figure 6:
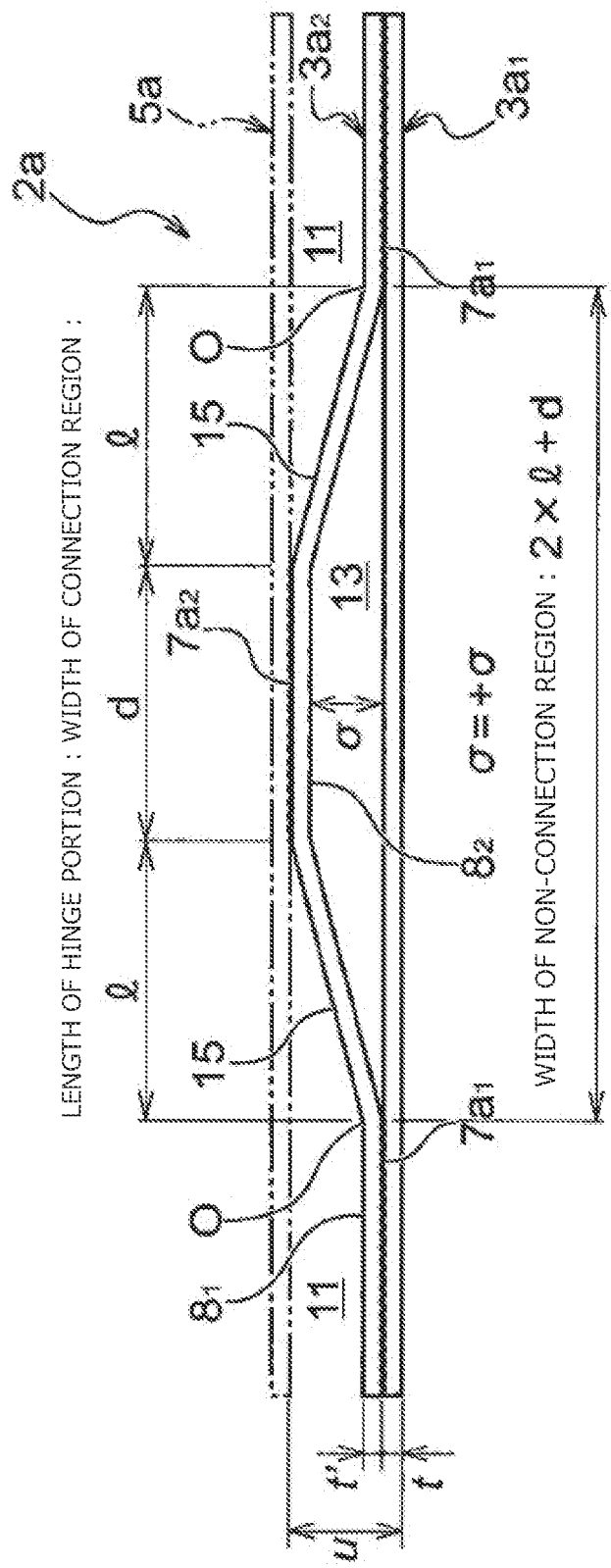
FIG. 6 is a cross-sectional view illustrating the actuator part in the extended state of the multilayer electrostatic actuator illustrated in FIG. 1.

When a tensile force (external force) is applied to the multilayer electrostatic actuator 1 in the layering direction Z, the non-connection region 15 (hinge portion 15) of the second film $3a_2$ of the actuator part $2a$ is elastically deformed (bent and extended), and the interval between the first film $3a_1$ and the second film $3a_2$ is widened (FIG. 4), resulting in the multilayer electrostatic actuator 1 extending in the layering direction Z (FIG. 1). FIG. 6 is a cross-sectional view illustrating the actuator part $2a$ in the extended state of the multilayer electrostatic actuator 1. As illustrated in FIG. 6, when a tensile force (external force) is applied in the layering direction Z, the interval between the first film $3a_1$ and the second film $3a_2$ is widened. Given that the spring displacement of the hinge portion 15 in this case is σ, the distance u from the conductive layer 21 of the first film $3a_1$ to the conductive layer 21 of the first film $3b_1$ (FIG. 3) is $u_{extension}=2\times t_{23}+t_{23'}+\sigma$.

As described above, the second connection regions $7b_2$ of the actuator part $2b$ act as ribs that prevent the first film $3a_1$ of the actuator part $2a$ from being deformed in the layering direction Z, and the deformation of the first film $3a$: is suppressed, so that deformation occurs in which the fixed end of the hinge portion 15 moves in the layering direction Z. The above discussion mainly about the actuator part $2a$, $2b$ similarly applies to every actuator part $2a$, $2b$, $2c$ . . . , $2n$, and thus the stroke U of the multilayer electrostatic actuator 1 including these n actuator parts 2 layered is U=n×$(u_{extension}-u_{initial})$=n×σ.

Figure 7:
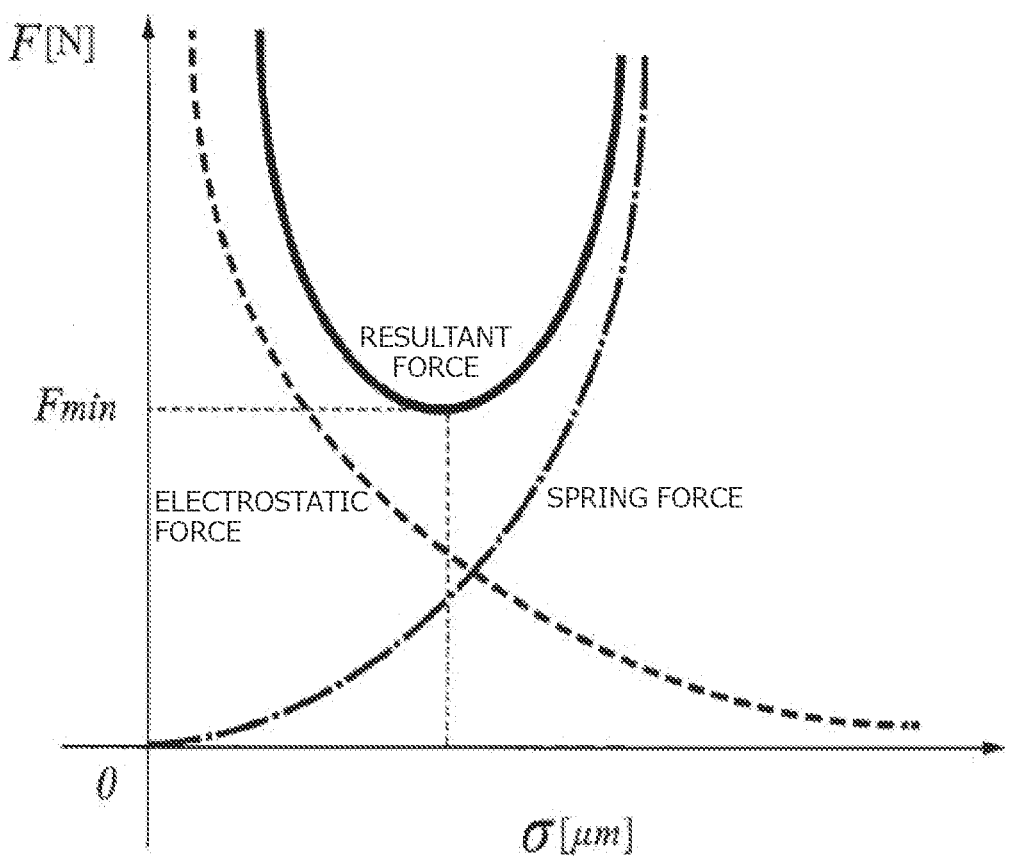
FIG. 7 is a graph illustrating the relationship between the resultant force of the electrostatic force and the spring force of the multilayer electrostatic actuator and the generated force of the electrode layer portion according to the present embodiment.
Figures 2, 7:
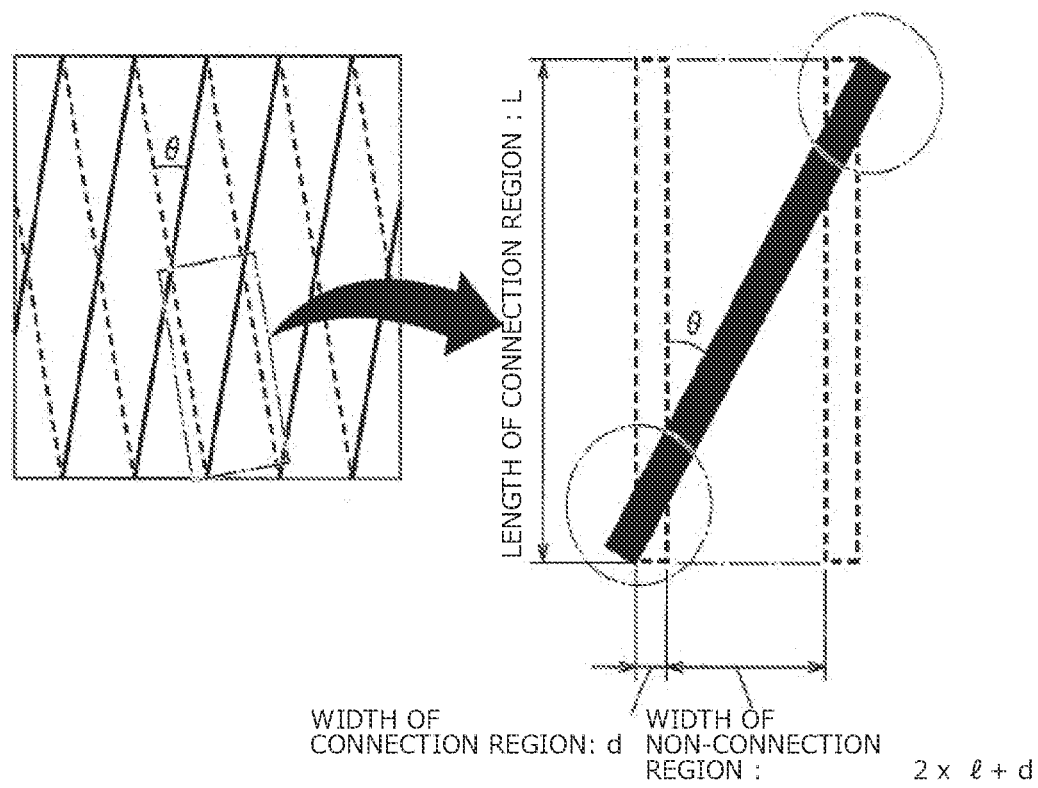

(1-4) Relationship Between Generated Force of Actuator Part and Resultant Force of Electrostatic Force and Spring Force FIG. 7 is a graph illustrating the relationship between the resultant force of the electrostatic force and the spring force of the multilayer electrostatic actuator 1 and the generated force F of the actuator part 2. The horizontal axis represents the spring displacement σ, and the vertical axis represents the generated force F of the actuator part 2. The spring force nonlinearly increases as the spring displacement σ increases, whereas the electrostatic force decreases approximately in inverse proportion to the square of σ as the spring displacement σ increases. In addition, the resultant force of the electrostatic force and the spring force draws a U-shaped curve as illustrated in the drawing. Given that the minimum value of the resultant force is Fmin, the generated force F of the actuator part 2 acts in the contraction direction with a magnitude of not less than Fmin.

Second Embodiment

In the multilayer electrostatic actuator 1 according to the first embodiment, the first film $3a_1$, $3b_1$ constituting the actuator part 2 is configured by the conductive film P, and the second film $3a_2$, $3b_2$ is configured by the insulating film Q. A multilayer electrostatic actuator 101 according to the second embodiment is different from the multilayer electrostatic actuator 1 according to the first embodiment in that both the first and second films constituting the actuator part are configured by the conductive film P.

(2-1) Basic Structure of Multilayer Electrostatic Actuator

The basic structure of the multilayer electrostatic actuator 101 and the basic structure of the actuator part according to the second embodiment are the same as those of the multilayer electrostatic actuator 1 according to the first embodiment, and FIGS. 1 and 2 are applied in their entirety. In addition, elements identical or similar to those of the multilayer electrostatic actuator 1 according to the first embodiment are denoted by identical or similar reference signs, and the description thereof will be omitted.

(2-2) Components of Multilayer Electrostatic Actuator

<Film>

As described above, in the multilayer electrostatic actuator 101 according to the second embodiment, both the first and second films $3a_1$, $3a_2$ constituting the actuator part are configured by the conductive film P illustrated in FIG. 3a.

<Connection Portion>

The connection portion of the actuator part of the multilayer electrostatic actuator 101 according to the second embodiment is the same as that of the multilayer electrostatic actuator 1 according to the first embodiment.

<Hinge Portion>

In the multilayer electrostatic actuator 1 according to the first embodiment, a voltage is applied between the first films $3a_1$, $3b_1$ of the overlapping actuator parts 2. The multilayer electrostatic actuator 101 according to the second embodiment is different from the multilayer electrostatic actuator 1 according to the first embodiment in that a voltage is applied between the overlapping first and second films $3a_1$, $3a_2$; $3b_2$, $3a_1$. When a voltage is applied between the first and second films $3a_1$, $3a_2$, the interval between the first and second films $3a_1$, $3a_2$ returns to the initial state due to the electrostatic attractive force (described later), resulting in the multilayer electrostatic actuator 101 contracting in the layering direction Z. The electrostatic attractive force caused by the voltage applied between the first film $3a_1$ and the second film $3a_2$ of the actuator part $2a$ acts to narrow the interval between the first and second films $3a_1$, $3a_2$. The gap between the other first and second films $3b_1$, $3b_2$ and the gap between the first film and the second film (e.g. $3b_1$ and $3a_1$) of different actuator parts 2 overlapping each other are similarly narrowed due to the electrostatic attractive force, resulting in the multilayer electrostatic actuator 101 contracting in the layering direction Z.

The basic structure of the actuator part of the multilayer electrostatic actuator 101 according to the second embodiment is the same as that of the actuator part 2 of the multilayer electrostatic actuator 1 according to the first embodiment: therefore, the second connection regions $7b_2$ of the actuator part $2b$ act as ribs with respect to the deformation of the non-connection region 15 of the first film $3a_1$ of the actuator part $2a$ in the layering direction Z. Therefore, when a tensile force (external force) is applied to the multilayer electrostatic actuator 101 in the layering direction Z, the non-connection region 15 of each of the second film $3a_1$ of the actuator part $2a$ and the second film $3b_1$ of the actuator part $2b$ is elastically deformed (bent and extended), but the deformation of the first film $3a_1$ of the actuator part $2a$ is suppressed. Thus, in the multilayer electrostatic actuator 101 according to the second embodiment, each actuator part has nonlinear spring characteristics as in the case of the multilayer electrostatic actuator 1 according to the first embodiment.

<Space>

The basic structure of the actuator part of the multilayer electrostatic actuator 101 according to the second embodiment is the same as that of the actuator part 2 of the multilayer electrostatic actuator 1 according to the first embodiment. Therefore, when a tensile force (external force) in the layering direction Z is applied to the multilayer electrostatic actuator 101, the second film $3a_2$ is elastically deformed, and the interval between the first and second films $3a_1$, $3a_2$ is separated, resulting in an increase in the opening area of the space 11, 13; whereas when a voltage is applied between the first and second films $3a_1$, $3a_2$ to cause an electrostatic attractive force, the interval between the first and second films $3a_1$, $3a_2$ is narrowed, resulting in a decrease in the opening area of the space 11, 13.

(2-3) Manner of Operation of Multilayer Electrostatic Actuator

In the multilayer electrostatic actuator 101 having the above configuration, the extension/contraction state varies depending on whether a tensile force (external force) is applied in the layering direction Z and whether a voltage is applied between the first and second films $3a_1$, $3a_2$.

<Initial State (Contracted State)>

In the initial state or when a voltage is applied between the first and second films $3a_1$, $3a_2$ after application of a tensile force (external force) in the layering direction Z and an electrostatic attractive force acts and balances, the hinge portion 15 is not deformed, and the first film $3a_1$ and the second film $3a_2$ are in a planar state. At this time, the distance u from the conductive layer 21 of the first film $3a_1$ to the conductive layer 21 of the second film $3a2$ (FIG. 3) is $u_{initial}=2 \times t_{23}$ (not illustrated).

<Extended State>

When a tensile force (external force) is applied to the multilayer electrostatic actuator 101 in the layering direction Z, the interval between the first film $3a_1$ and the second film $3a_2$ is widened. The distance u from the conductive layer 21 of the first film $3a_1$ to the conductive layer 21 of the second film $3a_2$ (FIG. 3) is $u_{extension}=2 \times t_{23}+\sigma$. The above discussion mainly about the actuator part $2a$, $2b$ similarly applies to every actuator part $2a$, $2b$, $2c$, . . . , $2n$, and thus the stroke U of the multilayer electrostatic actuator 101 including these n actuator parts layered is $U=n \times (u_{extension}-u_{initial})=n \times 0$.

(2-4) Relationship Between Generated Force of Actuator Part and Resultant Force of Electrostatic Force and Spring Force Because the basic structure of the multilayer electrostatic actuator 101 according to the second embodiment is the same as that of the multilayer electrostatic actuator 1 according to the first embodiment, the relationship between the resultant force of the electrostatic force and the spring force of the actuator part and the generated force F of the actuator part in the multilayer electrostatic actuator 101 according to the second embodiment is also the same as that of the multilayer electrostatic actuator 1 according to the first embodiment, and FIG. 7 is applied in its entirety. However, in the second embodiment, the distance between the first film $3a_1$ and the second film $3a_2$ or between the second film $3b_2$ and the first film $3a_1$ is short as compared with the first embodiment in which contraction is caused by the electrostatic attractive force between the first films $3a_1$, $3b_1$ constituting the actuator part 2, and thus a large electrostatic attractive force is generated, which increases the contraction force.

(2-5) Application Examples of Multilayer Electrostatic Actuator

For the manufacture of the multilayer electrostatic actuator 101 according to the second embodiment, a structure with high productivity is required. The following two application examples represent an example of a structure that allows for efficient manufacture with high productivity, in which the end portion of the actuator part 2 in each layer includes an outer hinge portion 17 connected to the end portion of the actuator part 2 of another layer. The outer hinge portion 17 eliminates the need for a post-process for connecting homopolar electrodes, leading to improvement in productivity. Furthermore, because the structures of these application examples do not have an electrode connection portion having a local discharge risk, the reliability of the multilayer electrostatic actuator is improved.

<Bent Structure>

Figure 8:
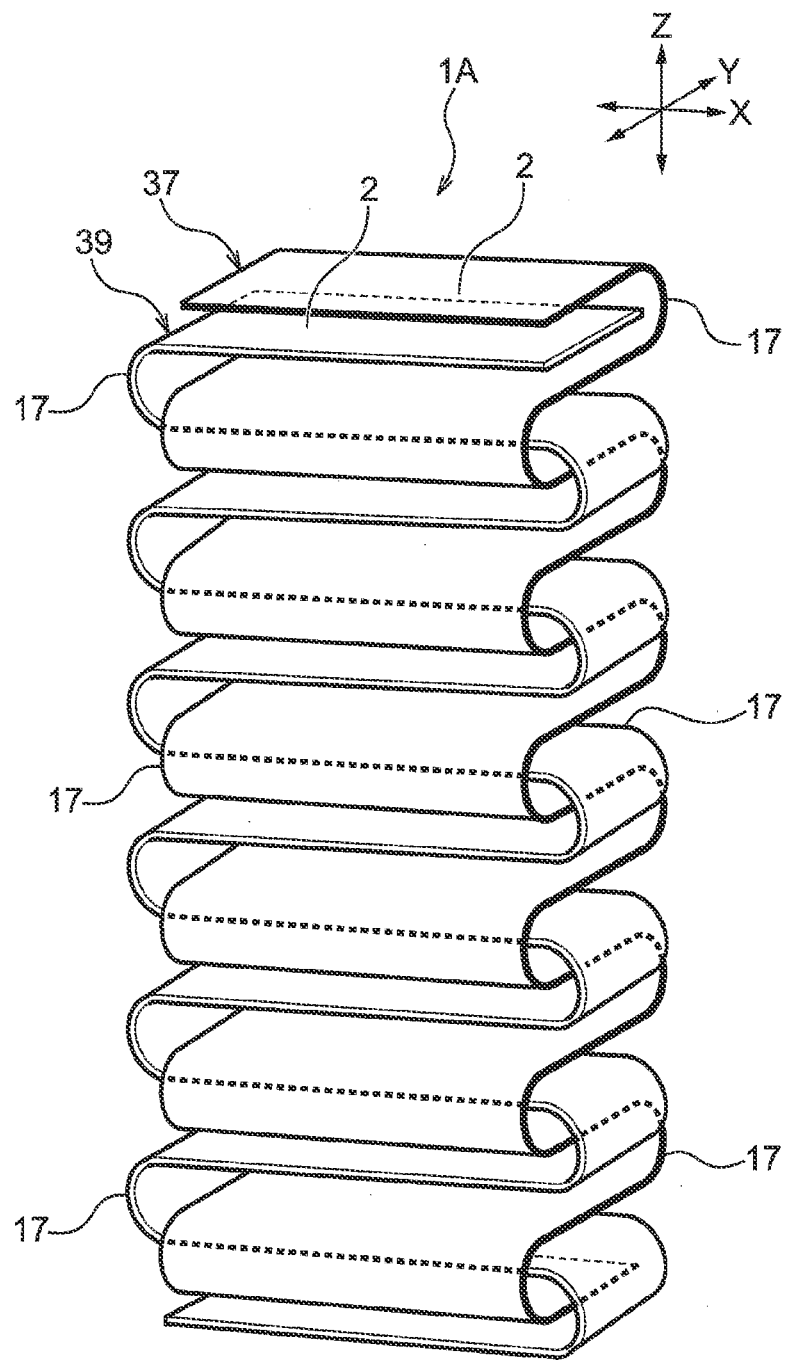
FIG. 8 is a perspective view illustrating a multilayer electrostatic actuator created with a bent structure.

FIG. 8 is a perspective view illustrating Application Example 1 in which the multilayer electrostatic actuator 1 illustrated in FIG. 1 is created with a bent structure. The multilayer electrostatic actuator 1A according to Application Example 1 has a paper spring structure in which two elongated ribbon-shaped electrodes 37, 39 are bent in a zigzag shape and alternately folded. The planar portions layered facing each other serve as the actuator parts 2 of different layers, and the loop-shaped connection portion extending outward from each actuator part 2 functions as the above-described outer hinge portion 17.

The multilayer electrostatic actuator part 1A with such a configuration can be efficiently manufactured as described above. In a multilayer electrostatic actuator without this configuration, the actuator parts are more likely to deform at positions closer to their end portions, which can make the distance between the actuator parts uneven. In contrast, in the multilayer electrostatic actuator part 1A, the outer hinge portion 17 functions as a semi-cylindrical structure that suppresses the deformation of the actuator part 2 in the plane direction: therefore, the end portion of the actuator part 2 has as uniform a distance as the central portion of the actuator part 2 between the connection surface portions 8 facing in the Z direction in each actuator part 2, which makes the movement in the layering direction Z stable and uniform, and can improve the driving force. Furthermore, the application of voltage to each actuator part 2 is performed simply on the two ribbon-shaped electrodes 37, 39 connected via the outer hinge portion 17, leading to simplified wiring.

<Wound Structure>

Figure 9:
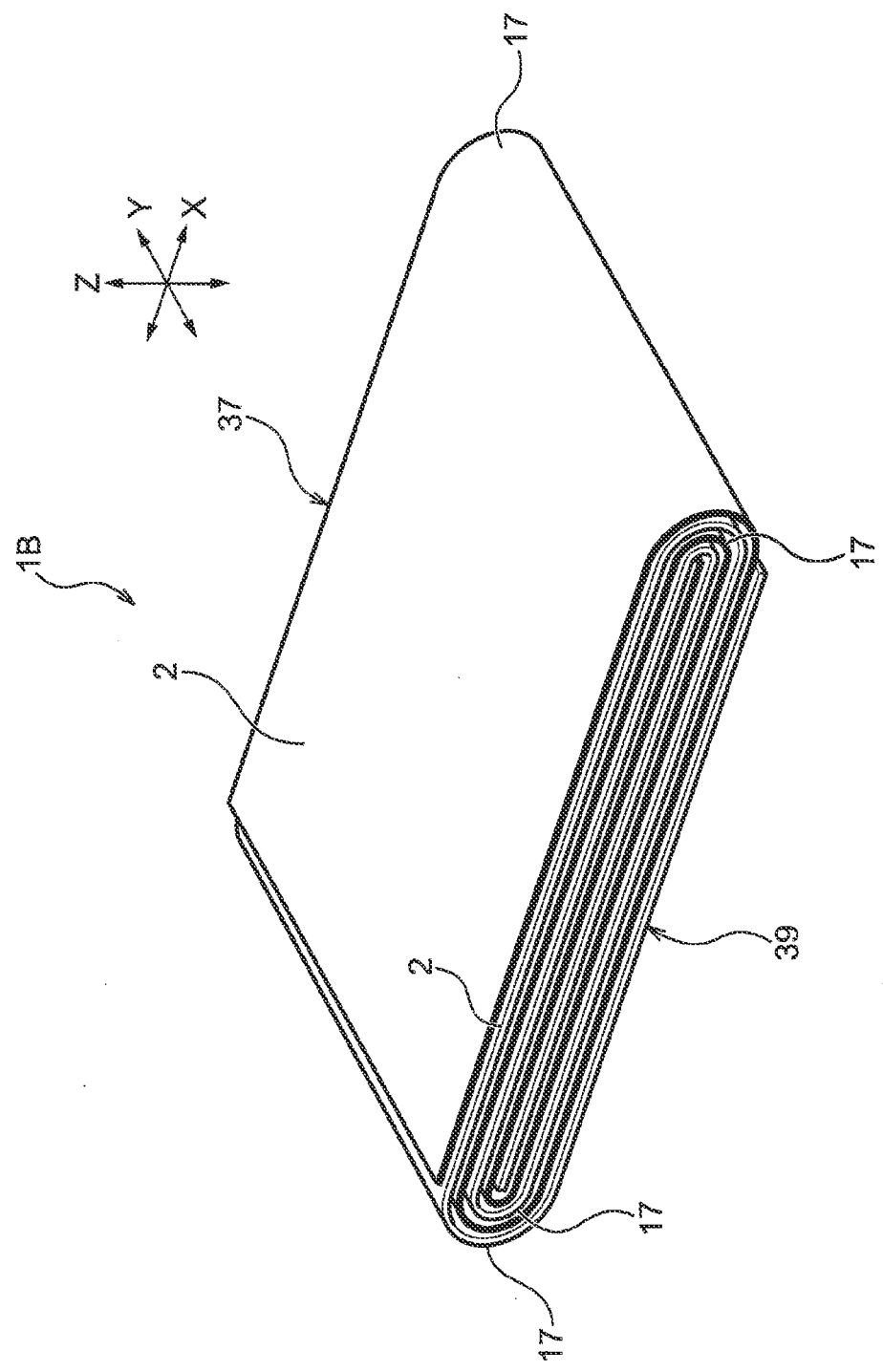
FIG. 9 is a perspective view illustrating a multilayer electrostatic actuator created with a wound structure.

FIG. 9 is a perspective view illustrating Application Example 2 in which the multilayer electrostatic actuator 1 illustrated in FIG. 1 is created with a wound structure. The multilayer electrostatic actuator 1B according to Application Example 2 has a flat spiral wound structure in which the two elongated ribbon-shaped electrodes 37, 39 are wound in one direction from the center. The planar portions layered facing each other serve as the actuator parts 2 of different layers, and the loop-shaped connection portion extending outward from each actuator part 2 functions as the above-described outer hinge portion 17.

The multilayer electrostatic actuator 1B with such a configuration can also be efficiently manufactured, similarly to the multilayer electrostatic actuator 1A with the bent structure. In addition, the application of voltage to the actuator part 2 in each layer is performed simply on the two ribbon-shaped electrodes 37, 39 connected via the outer hinge portion 17, leading to simplified wiring.

(3) Other Embodiments

The above-described embodiments are the basic embodiments of the present invention. The multilayer electrostatic actuator 1 according to the present embodiment is not limited to the above-described embodiments, and it is possible to change or remove a partial configuration without departing from the scope of the present embodiment, or to add a technique known and commonly used by those skilled in the art. For example, the planar shape of the multilayer electrostatic actuator 1 is not limited to the quadrangle described in the above-described embodiments, and may be another polygon such as a triangle or a pentagon, or may be a shape having a curve such as a circle, a semicircle, an oval, or an ellipse. In addition, the intersection angle θ of the actuator part 2 in each layer is not limited to 90° described in the above-described embodiments, and can be set to another angle such as 60° in the case that the planar shape of the multilayer electrostatic actuator 1 is a triangle, or 72° in the case that the planar shape is a pentagon.

FIG. 7-1 is an explanatory diagram for explaining the overlapping state of two actuator parts of the multilayer electrostatic actuator according to another embodiment, where (a) is a view as viewed in the layering direction Z, and (b) is a cross-sectional view taken along VII-VII in (a). The multilayer electrostatic actuators 1 according to the first and second embodiments are both configured by layering the actuator parts 2a, 2b at the intersection angle θ of 90°, from which the multilayer electrostatic actuator according to another embodiment is different in that the actuator parts 2a, 2b are layered at the intersection angle θ of an acute angle different from 90°. Elements identical or similar to the elements of the embodiments described above are denoted by identical or similar reference signs, and the description thereof will be omitted. The first connection regions 7a: (indicated by solid lines) and the second connection regions 7b₂ (indicated by broken lines) of the second film 3b₂ are arranged on the upper and lower sides of the first film 3a illustrated in (a), and the second connection regions 7a₂ (indicated by solid lines) and the first connection regions 7a₁ (indicated by broken lines) are arranged on the upper and lower sides of the second film 3a₂ illustrated in (b).

As viewed in the layering direction Z, as illustrated in FIG. 7-1a, the axes of the pattern of the first connection regions 7a₁ arranged on the first film 3a₁ of the actuator part 2a and the axes of the pattern of the second connection regions 7b₂ of the second film 3b₂ of the actuator part 2b placed under the actuator part 2a intersect at the intersection angle θ of an acute angle different from 90°. Therefore, when a tensile force (external force) in the layering direction Z is applied to the multilayer electrostatic actuator, the deformation of the first film 3a₁ is suppressed. On the other hand, as illustrated in FIG. 7-1b, the axes of the pattern of the second connection regions 7a₂ arranged on the second film 3a₂ and the axes of the pattern of the first connection regions 7a₁ arranged on the first film 3a₁ are parallel to each other and do not intersect each other. Therefore, when a tensile force (external force) in the layering direction is applied to the multilayer electrostatic actuator, the second film 3a2 is deformed.

FIG. 7-2 is an explanatory diagram for explaining the condition of intersection between the first connection regions 7a₁ and the second connection regions 7b₂ in the multilayer electrostatic actuator illustrated in FIG. 7-1. The patterns of the first connection regions 7a₁ and the second connection regions 7b, both form linear shapes having a substantially uniform width d and arranged at equal intervals. Given that the length, on the plane as viewed in the layering direction Z, of the axes of the pattern of one of the first connection regions 7a₁ of the actuator part 2a and the second connection regions 7b₂ of the actuator part 2b is L, and the width between the non-connection regions in the one connection regions as viewed in the layering direction Z is 2×l+d (see FIG. 6), the intersection angle θ [rad] of the axes of the patterns between the two connected actuator parts 2a, 2b as viewed in the layering direction Z satisfies $$\arctan\left(\frac{2 \times l + d}{L}\right) < |\theta| \le \frac{\pi}{2}. \quad \text{[Formula 2]}$$

In addition, the shape and arrangement (pattern) of the connection regions 7 is not limited to the shape and arrangement described in the above-described embodiments. It is possible to adopt various other shapes and arrangements (patterns) such as those in which the connection regions 7 with a circular shape or a quadrangular shape in plan view are arranged at equal intervals in the width direction X and the depth direction Y. Furthermore, in the above description, both the first connection regions and the second connection regions of the actuator part 2 in each layer are formed in linear shapes having a uniform width and arranged at equal intervals such that one first connection region is positioned at the center of the space between two second connection regions as viewed in the layering direction Z. However, as long as the first connection regions and the second connection regions do not overlap each other as viewed in the layering direction Z, the first connection regions and the second connection regions do not need to be linear or be arranged at equal intervals.

REFERENCE SIGNS LIST

1, 101, 1A, 1B multilayer electrostatic actuator
2, 2a, 2b, 2c actuator part
3 film
3a₁, 3b₁ first film
3a₂, 3b₂ second film
5a, 5b end member
7 connection region
7a₁, 7b₁ first connection region
7a₂, 7b₂ second connection region
8₁, 8₂ connection surface portion
11 space
13 space
15 non-connection region (or hinge portion)
17 outer hinge portion
21 conductive layer
23 insulating layer
37 ribbon-shaped electrode
39 ribbon-shaped electrode
θ intersection angle
Z layering direction
X width direction
Y depth direction
X, Y planar direction
U stroke
u distance
σ spring displacement
d width (of connection region)
l length (of hinge portion)
O supporting point
F generated force (of actuator part)
Z layering direction

The invention claimed is:

1. A multilayer electrostatic actuator including a plurality of actuator parts layered, the actuator parts each comprising:

a first film having a plurality of first connection regions formed on one surface in a pattern predetermined; and a second film connected to the first film via the first connection regions, and having a plurality of second connection regions formed on a surface opposite to the first film in a pattern identical to the pattern of the first connection regions, wherein on both the first film and the second film, a non-connection region is formed having a substantially fixed width between connection regions adjacent to each other as viewed in a layering direction (Z), the first connection regions and the second connection regions of each of the actuator parts are arranged so as not to overlap each other as viewed in the layering direction, two actuator parts overlapping each other among the actuator parts are connected via the second connection regions, and the two actuator parts connected are layered such that axes of the patterns between the two actuator parts intersect each other at an angle (θ, except θ=0°) predetermined as viewed in the layering direction.

2. The multilayer electrostatic actuator according to claim 1, wherein in each of the actuator parts, axes of the pattern of the first connection regions are parallel to each other, and axes of the pattern of the second connection regions are parallel to each other.

3. The multilayer electrostatic actuator according to claim 1, wherein in each of the actuator parts, axes of the pattern of the second connection regions are parallel to axes of the pattern of the first connection regions.

4. The multilayer electrostatic actuator according to claim 1, wherein the patterns of the first connection regions and the second connection regions both form linear shapes having a substantially uniform width and arranged at equal intervals.

5. The multilayer electrostatic actuator according to claim 1, wherein in each of the actuator parts, one of the first connection regions is positioned at a center of the non-connection region between two of the second connection regions as viewed in the layering direction.

6. The multilayer electrostatic actuator according to claim 1, wherein when a plane formed by the two actuator parts layered is viewed in the layering direction, axes of the pattern of the first connection regions ($7a_1$; $7b_1$) in the actuator part ($2a$; $2b$) in an upper layer intersect axes of the pattern of the second connection regions ($7b_2$; $7c_2$) in the actuator part ($2b$; $2c$) in a lower layer at at least one point.

7. The multilayer electrostatic actuator according to claim 6, wherein the patterns of the first connection regions and the second connection regions both form linear shapes having a substantially uniform width (d) and arranged at equal intervals, and given that a length, on the plane as viewed in the layering direction, of the axes of the pattern of one of the first connection regions of the actuator part in the upper layer and the second connection regions of the actuator part in the lower layer is L, and a width between the non-connection regions in the one connection regions as viewed in the layering direction is 2×l+d, the angle θ [rad] of intersection of the axes of the patterns between the two actuator parts connected as viewed in the layering direction satisfies $$\arctan\left(\frac{2 \times l + d}{L}\right) < |\theta| \le \frac{\pi}{2}. \quad \text{[Formula 3]}$$

8. The multilayer electrostatic actuator according to claim 1, wherein when the multilayer electrostatic actuator extends:

the first film and the second film in each of the actuator parts are separated from each other to form a space (13) in the non-connection region of the first film and the second film; and the first film of the actuator part in an upper layer and the second film of the actuator part in a lower layer are separated from each other to form a space (11) in the non-connection region of the first film and the second film, the two spaces (11, 13) are in fluid communication with outside, and fluid is allowed to flow in and out between the spaces and outside when the multilayer electrostatic actuator extends and contracts.

9. The multilayer electrostatic actuator according to claim 1, wherein a planar shape of the actuator parts is a quadrangle, and the two actuator parts overlapping each other are layered at the angle of intersection predetermined of 90°.

10. The multilayer electrostatic actuator according to claim 1, wherein the first film includes a three-layer structure of an insulating layer (23), a conductive layer (21), and an insulating layer (23), the second film is configured by an insulating layer, the second film has, as viewed in the layering direction, a first connection surface portion ($8_1$) connected to the first film via the first connection regions, a second connection surface portion ($8_2$) connected to the first film of the actuator part on an upper side in the layering direction via the second connection regions, and a hinge portion (15) in which neither the first connection regions nor the second connection regions are formed, when the multilayer electrostatic actuator is pulled in the layering direction due to an external force, the hinge portion is elastically deformed to separate the first film and the second film, and the multilayer electrostatic actuator extends in the layering direction, and when a voltage is applied between the first films of the two actuator parts layered, the two first films are attracted to each other due to an electrostatic attractive force, and the multilayer electrostatic actuator contracts in the layering direction.

11. The multilayer electrostatic actuator according to claim 1, wherein both the first film and the second film include a three-layer structure of an insulating layer (23), a conductive layer (21), and an insulating layer (23), the second film has a first connection surface portion ($8_1$) connected to the first film via the first connection regions, a second connection surface portion ($8_2$) connected to the first film of the actuator part on an upper side in the layering direction via the second connection regions, and a hinge portion (15) in which neither the first connection regions nor the second connection regions are formed, when the multilayer electrostatic actuator is pulled in the layering direction due to an external force, the hinge portion is elastically deformed to separate the first film and the second film, and the multilayer electrostatic actuator extends in the layering direction, and when a voltage is applied between the first film and the second film, the two films are attracted to each other due to an electrostatic attractive force, and the multilayer electrostatic actuator contracts in the layering direction.

12. The multilayer electrostatic actuator according to claim 11, wherein
- the first film and the second film have an elongated ribbon shape,
- the multilayer electrostatic actuator has a paper spring structure in which two first films and two second films are bent in a zigzag shape and alternately folded such that longitudinal directions of the first films and the second films intersect each other at 90° as viewed in the layering direction,
- on a plane where the two first films and the two second films overlap each other as viewed in the layering direction, a plurality of the actuator parts layered are formed, and a bent portion formed outside the plane constitutes an outer hinge portion (17), and
- the first films or the second films of the actuator parts in different layers are integrated with each other by the outer hinge portion.

13. The multilayer electrostatic actuator according to claim 11, wherein
- the first film and the second film have an elongated ribbon shape,
- the multilayer electrostatic actuator has a flat spiral wound structure in which two first films and two second films are wound in one direction from a center,
- on a plane where the two first films and the two second films overlap each other as viewed in the layering direction, a plurality of the actuator parts layered are formed, and a bent portion formed outside the plane constitutes an outer hinge portion (17), and
- the first films or the second films of the actuator parts in different layers are integrated with each other by the outer hinge portion.

\* \* \* \* \*